(12) United States Patent
Filla et al.

(10) Patent No.: US 8,965,634 B2
(45) Date of Patent: *Feb. 24, 2015

(54) VEHICLE WITH A CONTROLLABLE WHEEL ROUTE

(75) Inventors: Reno Filla, Eskilstuna (SE); Joakim Unneback, Eskilstuna (SE); Bobbie Frank, Eskilstuna (SE); Andreas Nordstrand, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/115,882

(22) PCT Filed: May 6, 2011

(86) PCT No.: PCT/KR2011/003378
§ 371 (c)(1),
(2), (4) Date: Nov. 8, 2013

(87) PCT Pub. No.: WO2012/153875
PCT Pub. Date: Nov. 15, 2012

(65) Prior Publication Data
US 2014/0081523 A1    Mar. 20, 2014

(51) Int. Cl.
*G06F 17/00* (2006.01)
*B62D 6/00* (2006.01)
*B62D 7/15* (2006.01)

(52) U.S. Cl.
CPC .............. *B62D 6/002* (2013.01); *B62D 7/1509* (2013.01)
USPC ................. 701/41; 192/38; 475/151; 475/204

(58) Field of Classification Search
CPC ...... B62D 6/002; B62D 7/1509; B62D 12/00; F16D 41/086

USPC ......................... 701/41; 192/38; 475/151, 204
See application file for complete search history.

(56) References Cited

U.S. PATENT DOCUMENTS 5,076,382 A * 12/1991 Vaughn et al. ................. 180/413
6,652,407 B2 * 11/2003 Ronk et al. .................... 475/204
(Continued)

FOREIGN PATENT DOCUMENTS

JP        10-119809 A    5/1998
JP        08-202448 A    8/1998
(Continued)

OTHER PUBLICATIONS

International Search Report (Feb. 28, 2012) for corresponding International Application PCT/KR2011/003379.
(Continued)

*Primary Examiner* — McDieunel Marc
(74) *Attorney, Agent, or Firm* — WRB-IP LLP

(57) ABSTRACT

A vehicle with a controllable wheel route includes a vehicle body, a first pair of wheels, which are individually suspended on both sides of the vehicle body to roll on the ground and can rotate around the vertical axis, a second pair of wheels, which are individually suspended on both sides of the vehicle body to roll on the ground, can rotate around the vertical axis, and are placed in the back of the first wheels, a regulator, which regulates each steering angle on the vertical axis of the first and second wheels, a mode selector, which is configured to select a first mode and a second mode, and a controller, which receives the first mode signal or the second mode signal from the mode selector and controls the regulator according to the received signal. The second wheel route is regulated to be identical to the first wheel route in the first mode, and the second wheel route is regulated to be different from the first wheel route in the second mode.

11 Claims, 9 Drawing Sheets

(56) References Cited

U.S. PATENT DOCUMENTS

| | | |
|---|---|---|
| 7,229,139 B2 * | 6/2007 | Lu et al. ............... 303/140 |
| 2002/0155914 A1 * | 10/2002 | Williams et al. ........ 475/151 |
| 2005/0206234 A1 * | 9/2005 | Tseng et al. ............ 303/146 |
| 2005/0236894 A1 * | 10/2005 | Lu et al. ............... 303/139 |
| 2006/0055129 A1 * | 3/2006 | Amano ................ 280/5.507 |
| 2006/0076828 A1 * | 4/2006 | Lu et al. ............... 303/146 |
| 2014/0081523 A1 * | 3/2014 | Filla et al. ............. 701/41 |
| 2014/0088834 A1 * | 3/2014 | Filla et al. ............. 701/41 |

FOREIGN PATENT DOCUMENTS

| | | |
|---|---|---|
| JP | 11-245839 A | 9/1999 |
| JP | 2004-009930 A | 1/2004 |

OTHER PUBLICATIONS

International Preliminary Report on Patentability (Aug. 1, 2013) for corresponding International Application PCT/KR2011/003379.

* cited by examiner (a)

(b)

(a)

(b)

(a)  (b)

(c)

(a)          (b)

(c)

(a)

(b)

(a)

(b)

(a)

(b)

(c)

VEHICLE WITH A CONTROLLABLE WHEEL ROUTE

BACKGROUND AND SUMMARY

The present invention relates to a vehicle, which can enhance the operation capability over severe terrain and reduce fuel consumption. References to the "invention" herein should be understood to be references to one or more aspects of the invention.

Construction vehicles as construction equipments have been developed in various shapes to satisfy various demands for providing necessary functions at the work site under various environmental conditions and for effectively displaying individual functions even in severe conditions.

As a representative example of such construction vehicles, there are vehicles that are loaded therein and operated. Such vehicles are generally classified into an articulated dump truck and a rigid dump truck.

An articulated dump truck refers to a vehicle wherein one or more trailers accommodating loads are connected to one another. A rigid dump truck refers to a vehicle in the shape of a body. Specifically, the present invention relates to a rigid dump truck.

Such a vehicle is basically operated in a normal condition. When a vehicle is operated in severe conditions, however, there would be many difficulties in operation itself. Particularly, in the event a vehicle is operated in the area that the terrain is seriously curved or the ground is not firm, there would be substantial difficulties in operating the vehicle due to many variables. Below is an example of such case.

When the wheels of a vehicle pass over the ground that is neither flat nor firm, the center of gravity of the vehicle may be moved considerably toward one side. Thus, it would be difficult to keep its balance. In a worse case, it may lead to vehicle overturn. A repetitive operation in such terrain will cause a problem, such as giving a shock to a driver. Accordingly, safety and terrainability of a vehicle will be considerably lowered.

In addition, under this situation, several wheels fail to be in sufficient contact with the ground, and thus they cannot display their traction force or will be spinning with no traction, which may result in difficulty in operation.

In order to solve these problems, a leveling arrangement may be used. The leveling arrangement prevents the center of gravity of a vehicle from leaning rapidly toward one side on the ground that is not flat to secure stability of the vehicle. Specifically, the leveling arrangement regulates the height of the axle connected to each of the right and left wheels so that the vehicle maintains level.

However, if a vehicle is equipped with the leveling arrangement, the manufacturing costs will increase. Moreover, it is not easy to control the leveling arrangement, and it is not guaranteed that a vehicle equipped only with the leveling arrangement will be stably operated. Accordingly, an alternative is required.

When a vehicle is operated, it is important to prepare a measure for reduction in fuel consumption, as well as smooth steering or maintenance of vehicle stability. Normal vehicles are equipped with two or more pairs of wheels that are connected to the front and the rear. These wheels are connected to the axle fixed to the vehicle body to rotate around the rotational axis.

When a vehicle forming such wheels travels straight ahead, the wheels placed on the rear are operated to follow the route of the wheels placed on the front, in which case, the wheels will not be dragging. When traveling on a curve, the wheels will be dragging as the wheels do not roll toward the traveling direction. Since such wheel dragging considerably increases fuel consumption, a measure for solving this problem is required. Furthermore, these normal vehicles are difficult to be operated in the severe terrain, as stated above.

The present invention was designed to solve the aforesaid problems. The present invention discloses an example of a vehicle, wherein each wheel connected to a vehicle is individually suspended and steerable, and the route of the front and rear wheels are selectively controlled to minimize fuel consumption and enhance traction force.

A vehicle with a controllable wheel route according to a preferred example of the present invention comprises: a vehicle body; a first pair of wheels, which are individually suspended on both sides of the vehicle body to roll on the ground and can rotate around the vertical axis; a second pair of wheels, which are individually suspended on both sides of the vehicle to roll on the ground, can rotate around the vertical axis, and are placed in the back of the first wheels; a regulator, which regulates a steering angle of each of the first wheels and the second wheels around the vertical axis; a mode selector, which is configured to select a first mode and a second mode; and a controller, which received a first signal or a second signal from the mode selector and controls the regulator according to the received signal, wherein the second wheel route is regulated to be identical to the first wheel route in the first mode, and the second wheel mute is regulated to be different from the first wheel route in the second mode.

In the first mode, the regulator regulates the first wheels and the second wheels to be linearly arranged, without being rotated around the vertical axis.

To the contrary, the regulator in the first mode regulates the first wheels and the second wheels to be arranged on a curve which forms a concentric circle with the vehicle center route so that the steering angle of the first wheels and the second wheels, which are placed on the outer side of the curve, around the vertical axis is lower than the steering angle of the first wheels and the second wheels, which are placed on the inner side of the curve.

In a vehicle with a controllable wheel route according to the preferred example of the present invention, the regulator in the second mode regulates the second wheel route to repeatedly cross the first wheel route.

The regulator in the second mode regulates the first wheels to be arranged without being rotated around the vertical axis and the second wheels to repeat a clockwise rotation and a counterclockwise rotation around the vertical axis.

Unlike this, the regulator in the second mode regulates the second wheels to be arranged without being rotated around the vertical axis and the first wheels to repeat a clockwise rotation and a counterclockwise rotation around the vertical axis.

Furthermore, the regulator in the second mode, the steering angle of the first wheels and the second wheels around the vertical axis to be identical and to repeat a clockwise rotation and a counterclockwise rotation.

In a vehicle with a controllable wheel route according to a preferred example of the present invention, the regulator in the second mode regulates the second wheel route to be parallel with the first wheel route.

The vehicle further comprises a third pair of wheels, which are individually suspended on both sides of the vehicle body to roll on the ground, can rotate around the vertical axis, and are placed in the back of the second wheel. The regulator regulates the steering angle of the third wheels around the vertical axis. In the first mode, the regulator regulates the third wheel route to be identical to the first wheel route and the second wheel route. In the second mode, the regulator regulates the third wheel route to be different from the first wheel route and the second wheel route.

Further, the vehicle comprises a drive unit, which individually drives the first wheel, the second wheel, and the third wheel, and a transmission, which changes the speed of the first, second, and third wheels.

According to an example of the present invention as stated above, modes vary depending on terrain conditions or operation conditions. Specifically, in the first mode, the second wheel route and the first wheel route are regulated to be identical to minimize rolling friction in the second wheel, which results in reducing fuel consumption. In the second mode, the second wheel route and the first wheel route are regulated to be different to increase traction force of the second wheel, which results in easily operating a vehicle. That is the vehicle of the present invention achieves both a lower fuel consumption and easy operation of a vehicle.

Further, unlike the conventional vehicle, wherein the load is being taken by the vehicle body frame, which makes a design to counteract bending and torsional stresses necessary, which in turn results in increasing the vehicle weight and fuel consumption, the vehicle in the present invention is designed such that the load is mostly supported directly above the wheels, which makes a lighter frame design possible and due to decreased total mass results in an advantage of reducing fuel consumption.

TERMS FOR DRAWING REFERENCE NUMERALS

Figure 1:
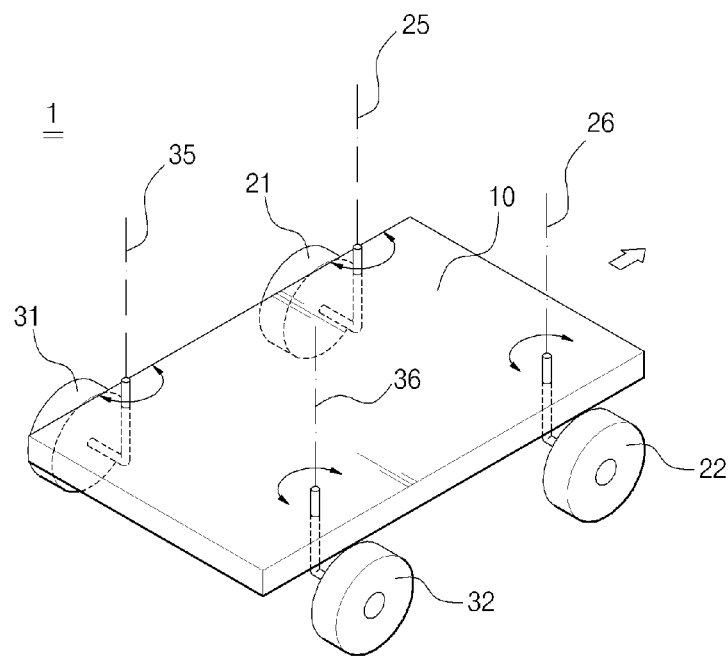
FIG. 1 is a perspective view that roughly illustrates a vehicle according to an example of the present invention.

1: vehicle
10: vehicle body
21: first left wheel
22: first right wheel
25, 26, 35, 36, 75, 76: vertical axis
31: second left wheel
32: second right wheel
40: regulator
50: mode selector
60: controller
71: third left wheel
72: third right wheel
80: drive unit
90: transmission

DETAILED DESCRIPTION

Figure 2:
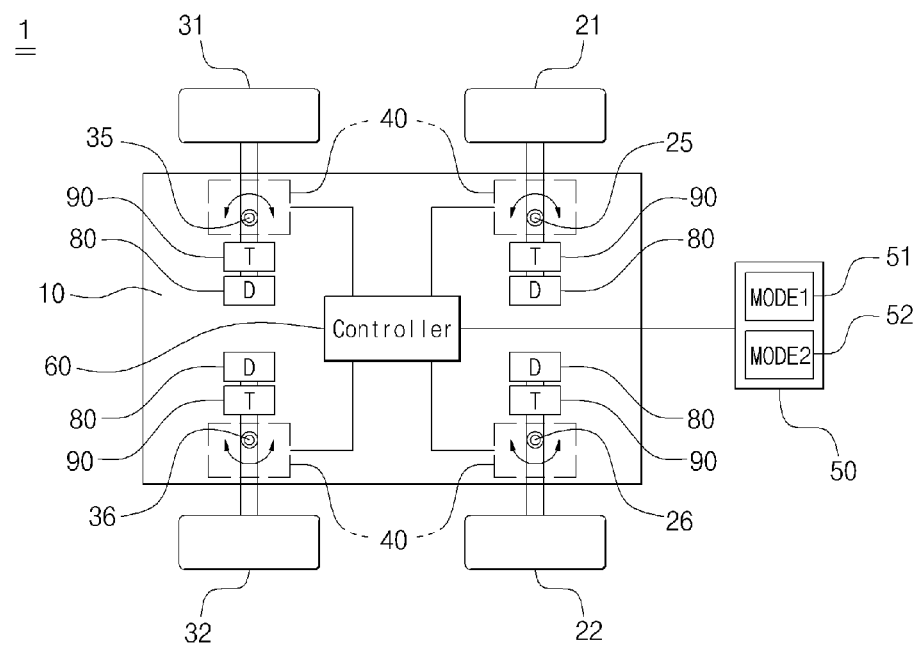
FIG. 2 roughly illustrates the relationship between the constitutions of the vehicle according to FIG. 1.

FIG. 1 is a perspective view that roughly illustrates a vehicle (1) according to an example of the present invention. FIG. 2 is a drawing that roughly illustrates the relationship between the constitutions of the vehicle (1) according to FIG. 1.

Figure 9:
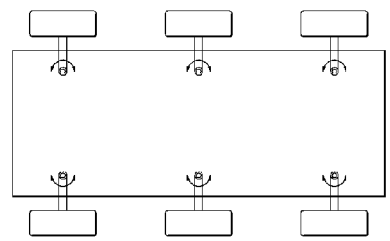
FIG. 9 and FIG. 10 roughly illustrate a vehicle according to another example of the present invention.
Figure 10:
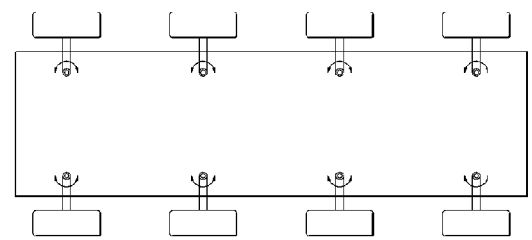

The vehicle (1) according to the present invention can move by being, driven by a drive unit (80) provided therein or pulled by a tow truck. As shown in FIG. 1, the vehicle (1) can be configured to comprise, two pairs of wheels (21, 22, 31, 32) that are equipped in the front and the rear. Further, as shown in FIG. 9 and FIG. 10, it can be configured to comprise three or four pairs of wheels. As stated above, the vehicle may comprise three or more pairs of wheels. However, below is an explanation on a vehicle configured to comprise two pairs of wheels fir the sake of convenience.

Further, in the present invention, there is a case that the vehicle (1) travels in a relatively rough terrain. An excellent operation capability in such terrain will be defined as "terrainability" in the present invention.

The vehicle (1) according to the present invention is configured to basically carry a load, and to comprise a vehicle body (1) and wheels (21, 22, 31, 33) that are connected to the vehicle body (1) to roll on the ground.

These wheels are classified into a first pair of wheels (21, 22) and a second pair of wheels (31, 32). All the wheels are individually suspended in the vehicle body (10) and individually steerable. That is, in a pair of wheels arranged in the shape of bilateral symmetry, there is no axle for connecting both wheels (21, 22 or 31, 32), and each wheel is individually suspended and can rotate.

The first wheels (21, 22) and the second wheels (31, 32) can have respective steering angles and rotate (roll) because they are not connected by the axle. Further, the steering angle can be individually regulated because the wheels can rotate around respective vertical axis (25, 26, 35, 36).

Although the first wheels (21, 22) and the second wheels (31, 32) are connected to the vehicle body (10) without an axle for connecting, left and right wheels, an axle is formed so that each wheel can be connected to the vehicle body (10) to be operated. Such an individual axle is connected on the basis of an individual vertical axis (25, 26, 35, 36) so that it can rotate.

The vehicle (1) according to the present invention comprises a regulator (40) for regulating the steering angle of each wheel, a mode selector (50), and a controller (60). Further, it may comprise a drive unit (80) for driving each wheel and a transmission (90) for varying the speed of each wheel.

The regulator (40) regulates each steering angle around the vertical axis (25, 26, 35, 36) of the first wheels (21, 22) and the second wheels (31, 32). The regulator (40) refers to a unit for varying the steering angle of the first wheels (21, 22) and the second wheels (31, 32), and may comprise a hydraulic cylinder or a gear apparatus. It may also comprise a driving apparatus for varying the steering angle of the first wheels (21, 22) and the second wheels (31, 32) in various types.

Assuming that the regulator (40) comprises a hydraulic cylinder, it is connected to the individual axle formed in each of the first wheels (21, 22) and the second wheels (31, 32) and the individual axle rotate based on the individual vertical axis (25, 26, 35, 36).

In the mode selector (50), a first mode (51) or a second mode (52) is selected by a driver (user). The mode selector may be in the shape of a switch or a lever. The mode information (the first mode (51) or the second mode (52)) in the mode selector (50) is transmitted to the controller (60). The controller (60) controls the regulator (40) according to the first mode (51) or the second mode (52).

The controller (60) comprises a plurality of sensors and microprocessors. The sensors included in the controller (60) are a sensor for sensing a speed difference between the wheels equipped in the right and the left (a speed difference between both wheels), a sensor for sensing the steering angle around the vertical axis (25, 26, 35, 36) of the first wheels (21, 22), etc., and a sensor for sensing traction force exerted on the first wheels (21, 22).

The sensor is a means for sensing the traveling direction of the vehicle (1) or the steering speed of each wheel. The routes (200) of the first wheels (21, 22) and the second wheels (31, 32) can be regulated through the sensor. For example, information on the traveling direction of the vehicle (1) and the route of the first wheels (21, 22) can be obtained from the sensor for sensing the speed difference between both first wheels (21, 22) (if there is no speed difference between both wheels, it is confirmed that the vehicle travels straight ahead; and if there is speed difference between both wheels, it is confirmed that the vehicle rotates toward any one side). Accordingly, the steering angle of both second wheels (31, 32) is regulated to control the route.

Such controller (60) controls the regulator (40) and the steering angle of the first wheels (21, 22) or the second wheels (31, 32).

The drive unit (80) transmits power to each wheel and allows each wheel to rotate (roll), that is, all the wheels are powered and therefore they are not just dragged or passively roll, but each wheel creates traction on its own. The drive unit (80) may comprise an electric or hydraulic motor and is mounted in each wheel. The transmission changes or regulates the speed when each wheel is driven by power transmitted by the driver, and comprises a combination of gears. The transmission is mounted in each wheel.

In the first mode (51), the steering angle of the first wheels (21, 22) and the second wheels (31, 32) are regulated so that the route (200) of the second wheels and the route (100) of the first wheels are identical. That is, the second wheels (31, 32) follow the route (100) of the first wheels, and thus the rolling friction caused by contacting the second wheels (31, 32) with the ground can be minimized, which results in minimizing fuel consumption.

In the second mode (52), the steering angle is regulated so that the route (200) of the second wheels is different from the route (100) of the first wheels. That is, the second wheels (31, 37) roll along the route different from the route (100) of the first wheels, and thus the second wheels (31, 32) will be in contact with a fresh ground, not the ground already deformed by the first wheels (21, 22) and have a stronger friction force and enough traction force, which results in enhancing terrainability.

Below is an explanation on the operation of the vehicle (1) in each of the first mode (51) and the second mode (52).

Figure 3:
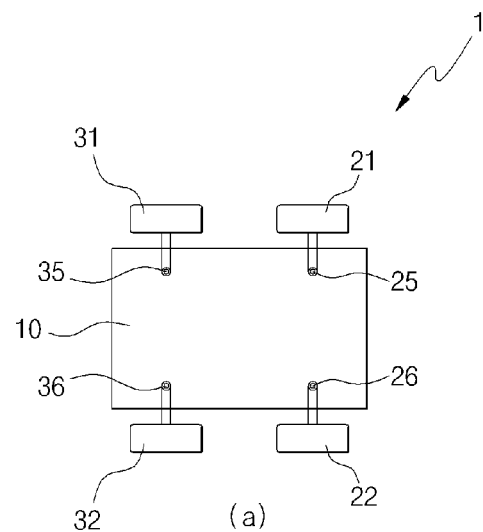
FIG. 3 roughly illustrates the arrangement state and routes of the vehicle wheels in the first mode.
Figure 3:
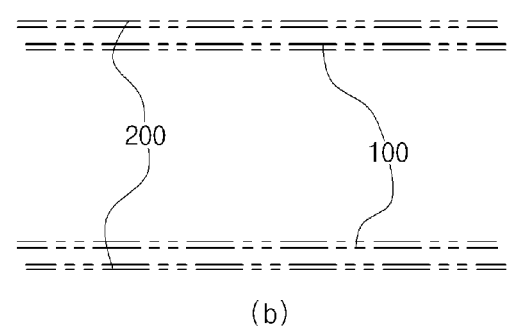

FIG. 3 roughly illustrates the arrangement state and routes of the wheels of the vehicle (1) in the first mode (51).

The vehicle (1) according to the present invention can be operated on the ground that is relatively flat and firm. Where the vehicle (1) travels straight ahead, such traveling may be not only for long distance or long time but also on one moment.

FIG. 3 illustrates this case, which corresponds to any one case of the operation in the first mode (51). A driver selects the first mode (51) from the mode selector (50). The controller (60) controls the regulator (40) according to the signal regarding the first mode (51) transmitted to the controller (60) so that the wheels can be arranged as shown in FIG. 3. In the first mode (51), the regulator (40) regulates the first wheels (21, 22) and the second wheels (31, 32) to be linearly arranged without rotating around the vertical axis (25, 26, 35, 36).

That is the first wheels (21, 22) and the second wheels (31, 32) are controlled by the controller (40) to be linearly arranged without rotating around the vertical axis (25, 26, 35, 36). Accordingly, the first wheels (21, 22) and the second wheels (31, 32) merely roll on the ground, without steering. In such case, the speeds of the first wheels (21, 22) and the second wheels (31, 32) that are driven by the drive unit (80) and the transmission (90) are maintained to be constant, wherein the first wheels (21, 22) and the second wheels (31, 32) roll straight ahead while maintaining their specific linear form and the route (200) of the second wheels are identical to the route (100) of the first wheels.

Under this situation, the first wheels (21, 22) and the second wheels (31, 32) only roll without being, dragged, and the rolling friction caused by contacting the second wheels (31, 32) with the ground can be minimized. Consequently, the fuel consumption can be minimized.

Figure 4:
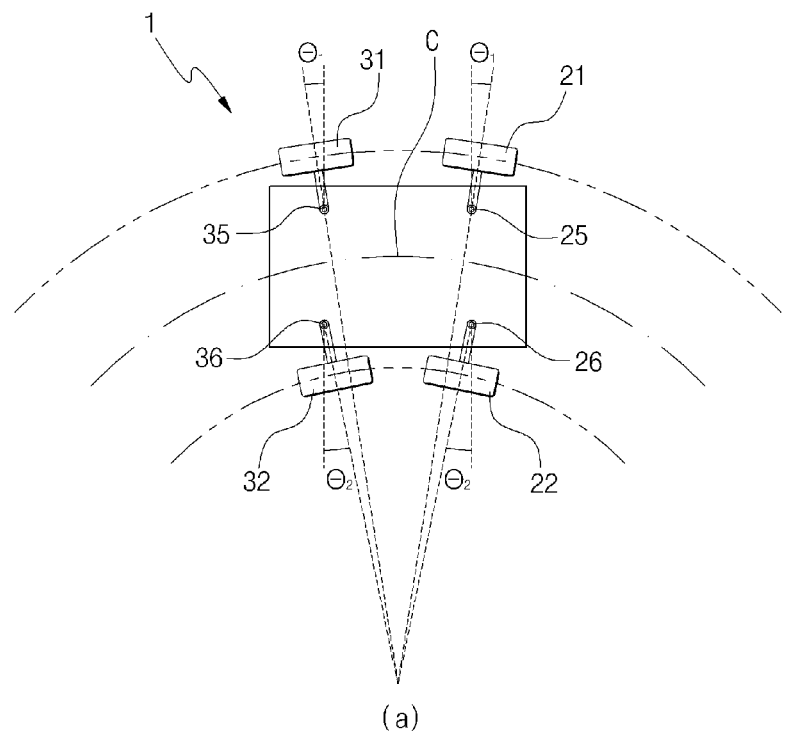
FIG. 4 roughly illustrates the arrangement state and routes of the vehicle wheels in another first mode.
Figure 4:
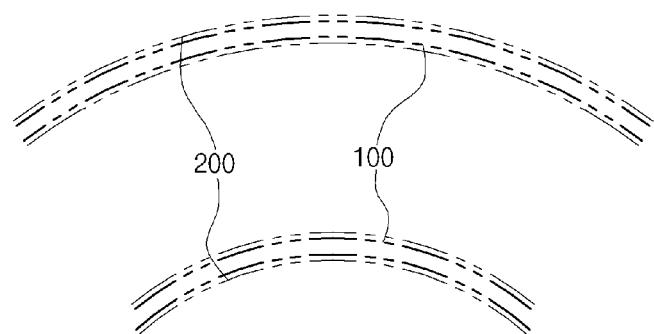

FIG. 4 roughly illustrates the arrangement state and routes of the wheels of the vehicle (1) in the first mode (51) of another shape.

The vehicle (1) according to the present invention, unlike in FIG. 3, may happen to travel on a curve. However, such traveling on a curve may be not only for long time or long distance but also on a moment.

FIG. 4 illustrates this case, which corresponds to any one case of the operation in the first mode (51). In the first mode (51) with this type, the routes (100, 200) of the first wheels and the second wheels are identical, but the first wheels (21, 22) and the second wheels (31, 32) are controlled to rotate around the vertical axis (25, 26, 35, 36) and to be arranged on a curve.

Particularly, in order to minimize the dragging occurred in the first wheels (21, 22) and the second wheels (31, 32), the first wheels (21, 22) and the second wheels (31, 32) are arranged on a curve which forms a concentric circle with the route of the center (C) of the vehicle (1) so that the steering angle around the vertical axis (25, 35) of the first wheel (21) and the second wheel (31), which are placed on the outer side of the curve, is lower than the steering angle around the vertical axis (26, 36) of the first wheel (22) and the second wheel (22), which are placed on the inner side of the curve ($\theta 1 < \theta 2$).

In this case, the first wheels (21, 22) and the second wheels (31, 32) all maintain their specific curve routes, and the route (200) of the second wheels is identical to the route (100) of the first wheels.

Even under such situation, the first wheels (21, 22) and the second wheels only roll, and thus the dragging is minimized. The rolling friction caused by contacting the second wheels (31, 32) with the ground can be minimized, which results in minimizing the fuel consumption FIG. 5 roughly illustrates the arrangement state and routes of the wheels of the vehicle (1) in the second mode (52).

The vehicle (1) according, to the present invention can be operated on the ground that is not firm, in which case, it is advantageous to secure terrainability by operation according to the second mode (52). That is, the second wheels (31, 32) do not follow the ground deformed by the first wheels (21, 22), but can be in contact with a fresh ground to exhibit excellent traction force.

Figure 5:
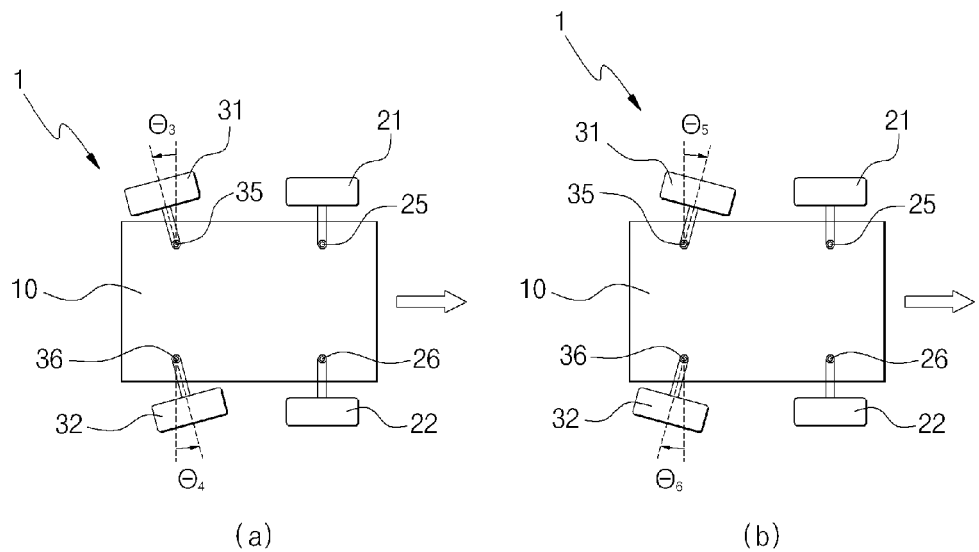
FIG. 5 roughly illustrates the arrangement state and routes of the vehicle wheels in the second mode.
Figure 5:
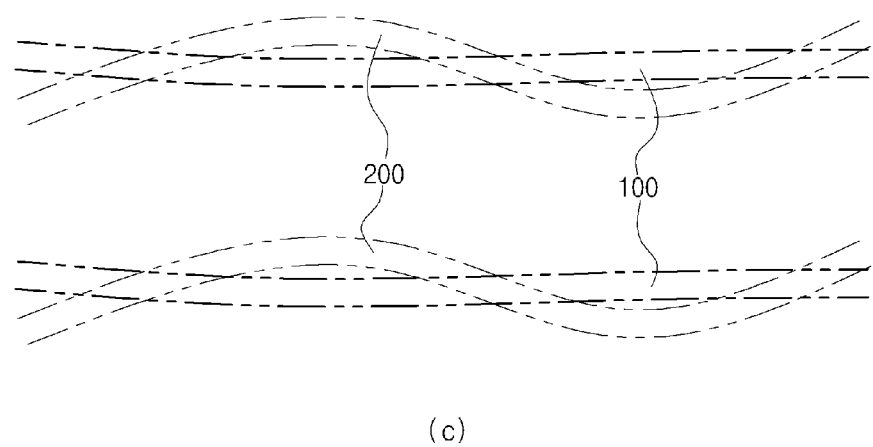

FIG. 5 illustrates this case, which corresponds to any one of the operation in the second mode (52). A driver selects the second mode (52) from the mode selector (50). The controller (6) controls the regulator (40) according to the signal regarding the second mode (52) transmitted to the controller so that the wheels are arranged as illustrated in FIG. 5.

The regulator (40) regulates the first wheels (21, 22) to be arranged without rotating around the vertical axis (25, 26), but it regulates the second wheels (31, 32) to repeat a clockwise rotation and a counterclockwise rotation around the vertical axis (35, 36). Herein, the regulator (40) can regulate the steering angle of the second wheels (31, 32) for a repetitive rotation in the range of a certain angle. Further, the range of such steering angle may be significantly large or small, and regular or irregular.

The speeds of the first wheels (21, 22) and the second wheels driven by the drive unit (80) and the transmission (90) may be regulated to be different from each other.

As stated above, the first wheels (21, 22) generally move straight ahead not to rotate around the vertical axis (25, 26), while the second wheels (31, 32) move in zigzags to repeat a clockwise rotation and a counterclockwise rotating. Accordingly, the route (200) of the second wheels becomes different from the route (100) of the first wheels.

Under this situation, the first wheels (21, 22) and the second wheels (31, 32) may be partly dragging. However, the second wheels (31, 32) can display sufficient friction force because they do not roll over the ground deformed by the first wheels (21, 22), but are in contact with a fresh ground. Consequently, the traction force is enhanced and excellent terrainability is exhibited FIG. 6 roughly illustrates the arrangement state and routes of the wheels of the vehicle (1) in the second mode (52) of another type.

Figure 6:
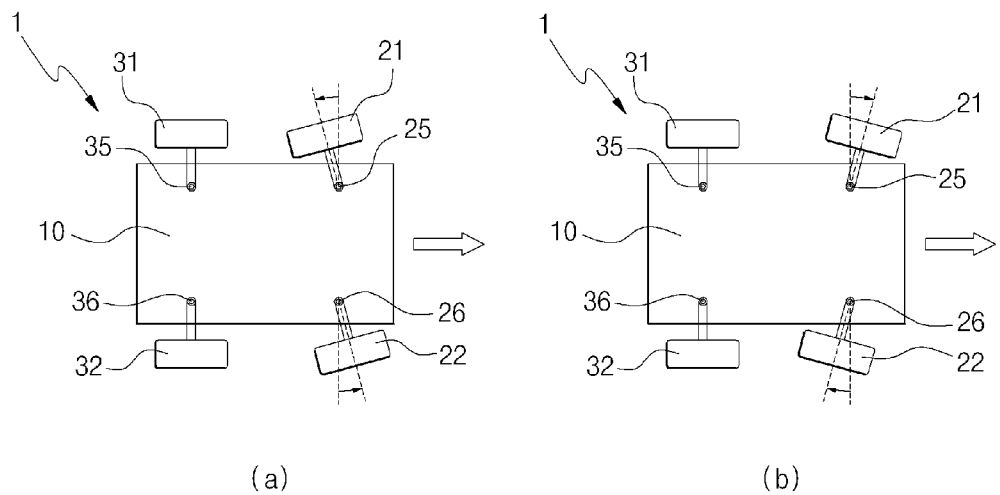
FIG. 6 roughly illustrates the arrangement state and routes of the vehicle wheels in another second mode.

The type of the second mode (52) as illustrated in FIG. 6 is similar to that of the second mode (52) as illustrated in FIG. 5. However, the steering of the first wheels (21, 22) and the steering of the second wheels (31, 32) are switched.

That is the regulator (40) regulates the second wheels (31, 32) to be arranged without rotating around the vertical axis (35, 36), while it regulates the first wheels (21, 22) to repeat a clockwise rotation and a counterclockwise rotation around the vertical axis (25, 26).

The second wheels (31, 32) move straight ahead not to rotate around the vertical axis (35, 36), while the first wheels (21, 22) move in zigzags to repeat a clockwise rotation and a counterclockwise rotation. Accordingly, the route (200) of the second wheels becomes different from the route (100) of the first wheels.

The first wheels (21, 22) and the second wheels (31, 32) may also be partly dragging. However, the second wheels (31, 32) can display sufficient friction force because they do not roll over the ground deformed by the first wheels (21, 22), but are in contact with a fresh ground. Consequently, the traction force is enhanced and excellent terrainability is exhibited.

Figure 7:
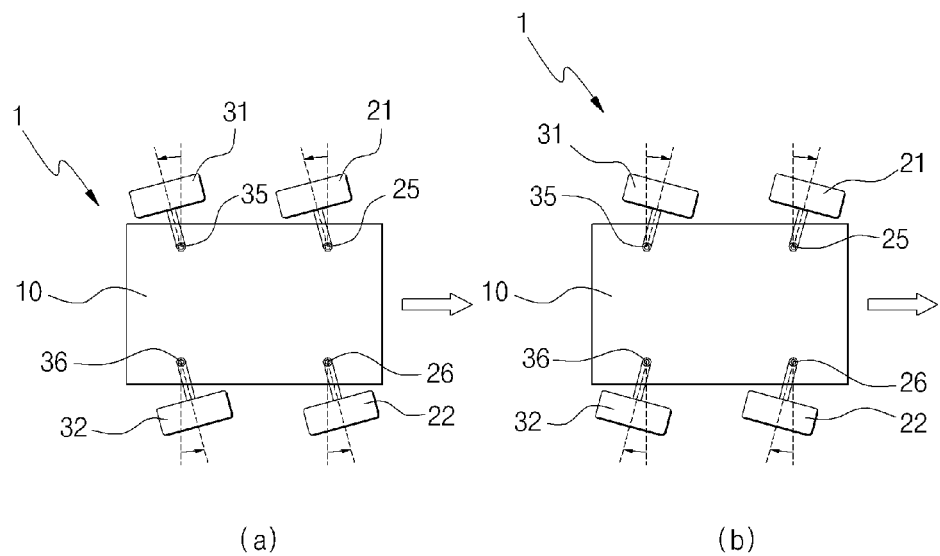
FIG. 7 roughly illustrates the arrangement state and routes of the vehicle wheels in another second mode.
Figure 7:
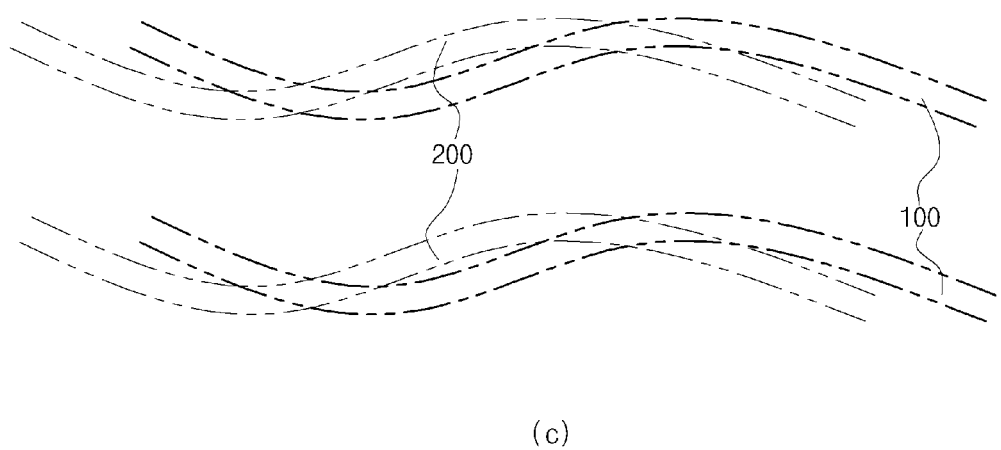

FIG. 7 roughly illustrates the arrangement state and routes of the wheels of the vehicle (1) in the second mode (52) of another type.

The type of the second mode (52) as illustrated in FIG. 7 is a combination of the types of the second mode as illustrated in FIG. 5 and FIG. 6.

That is, the regulator (40) regulates the steering angle around the vertical axis (25, 26, 35, 36) of the first wheels (21, 22) and the second wheels (31, 32) to be identical and to repeat a clockwise rotation and a counterclockwise rotation.

The first wheels (21, 22) and the second wheels (31, 32) move in zigzags to repeat a clockwise rotation and a counterclockwise rotation. The route (200) of the second wheels becomes different from the route (100) of the first wheels due to the difference between the front and the rear intervals.

The first wheels (21, 22) and the second wheels (31, 32) may also be partly dragging. However, the second wheels (31, 32) can display sufficient friction force because they do not roll over the ground deformed by the first wheels (21, 22), but are in contact with a fresh ground. Consequently, the traction force is enhanced and excellent terrainability is exhibited.

Figure 8:
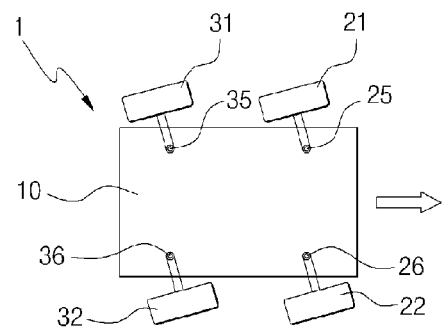
FIG. 8 roughly illustrates the arrangement state and routes of the vehicle wheels in another second mode.
Figure 8:
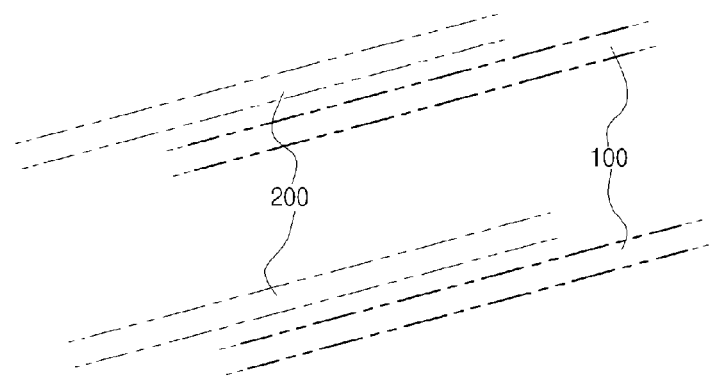

FIG. 8 roughly illustrates the arrangement state and route of the wheels of the vehicle (1) in the second mode (52) of another type.

The type of the second mode (52) as illustrated in FIG. 8 is different from the types of the second mode (52) as illustrated in FIG. 5 to FIG. 7, and the routes (100, 200) of the first wheels and the second wheels are not crossed.

In this case, the route (200) of the second wheels is regulated to be parallel with the route (100) of the first wheels. The regulator (40) regulates the first wheels (21, 22) and the second wheels (31, 32) to be arranged after rotating in a specific angle, and the vehicle body (10) to move in the oblique direction depending on the rotated angle of the first wheels (21, 22) and the second wheels (31, 32), wherein the first wheels (21, 22) and the second wheels (31, 32) are not dragging, but only be rolling. Further, the second wheels (31, 32) can display sufficient friction force because they do not roll over the ground deformed by the first wheels (21, 22), but are in contact with a fresh ground. Consequently, the traction force is enhanced and excellent terrainability is exhibited.

FIG. 9 and FIG. 10 roughly illustrate the vehicle (1) according to another example of the present invention.

As stated above, the vehicle (1) according to the present invention may be configured to comprise not only two pairs of wheels (first wheels (21, 22) and second wheels (31, 32), but also three or more wheels.

FIG. 9 illustrates a vehicle configured to comprise three pairs of wheels. FIG. 10 illustrates a vehicle configured to comprise four pairs of wheels. In the vehicles configured to comprise three or more pairs of wheels, the routes of all the wheels are regulated to be identical in the first mode (51), and the routes of all the wheels are regulated to be different in the second mode (52).

Below is an explanation on the regulation of the wheels in a vehicle configured to comprise three pairs of wheels. The wheels of a vehicle configured to comprise four pairs of wheels are regulated in the same principle.

Figure 11:
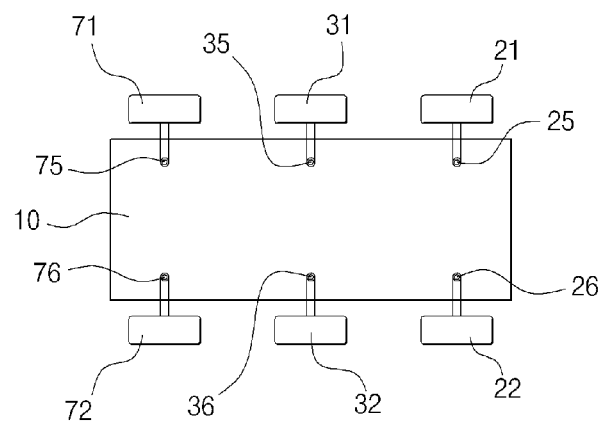
FIG. 11 roughly illustrates the arrangement state and routes of the wheels in the first mode of the vehicle according to FIG. 9.
Figure 11:
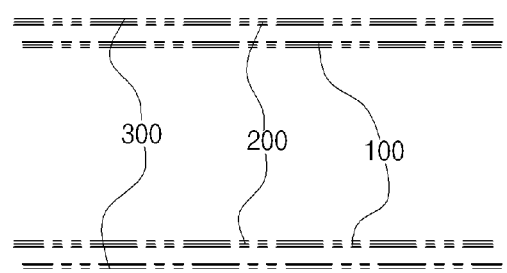

FIG. 11 roughly illustrates the arrangement state and routes of the wheels in the first mode (51) of the vehicle according to FIG. 9.

The first wheels (21, 22), the second wheels (31, 32) and the third wheels (71, 72) are controlled by the controller (40) to be linearly arranged without rotating around the vertical axis (25, 26, 35, 36, 75, 76). Accordingly, the first wheels (21, 22), the second wheels (31, 32) and the third wheels (71, 72) only roll on the ground, without steering.

In this case, the first wheels (21, 22), the second wheels (31, 32) and the third wheels (71, 72) all maintain their specific linear form to travel straight ahead. The route (100) of the first wheels, the route (200) of the second wheels and the route (300) of the third wheels become identical.

Furthermore, a vehicle configured to comprise three pairs of wheels can travel on a curve, similar to the type as illustrated in FIG. 4.

Figure 12:
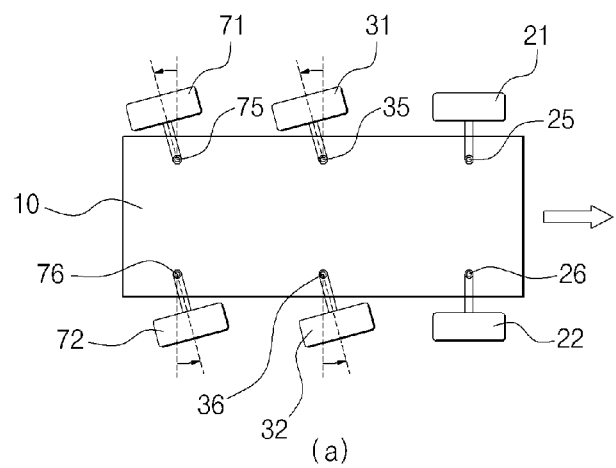
FIG. 12 roughly illustrates the arrangement state and routes of the wheels in the second mode of a vehicle according to FIG. 9.
Figure 12:
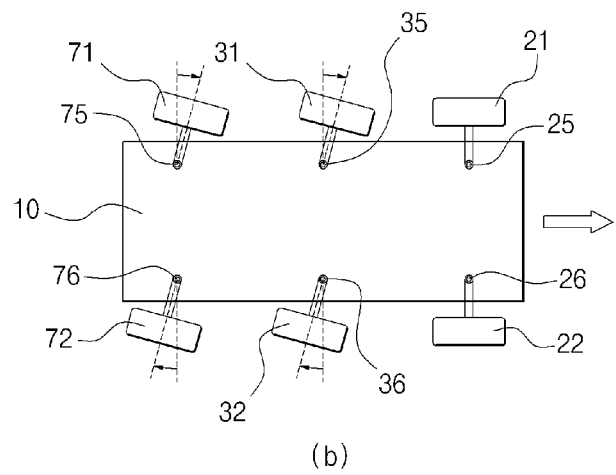
Figure 12:
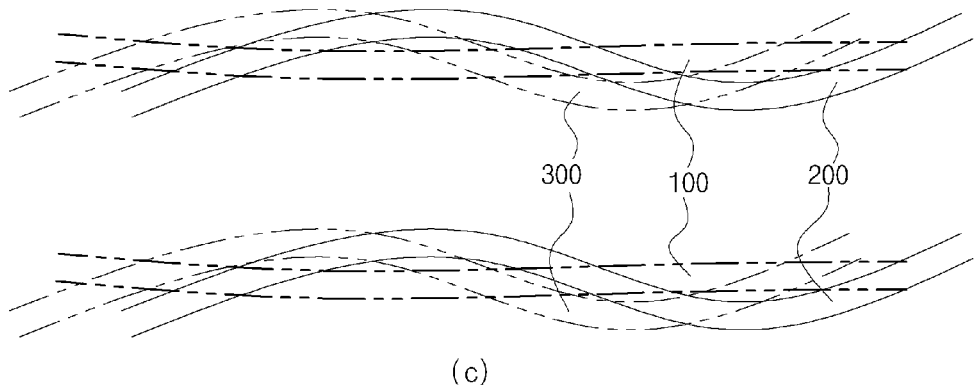

FIG. 12 roughly illustrates the arrangement state and routes of the wheels in the second mode (52) of the vehicle according to FIG. 9.

The regulator (40) regulates the first wheels (21, 22) to be arranged without rotating around the vertical axis (25, 26), while it regulates the second wheels (31, 32) and the third wheels (71, 72) to repeat a clockwise rotation and a counterclockwise rotation around the vertical axis (35, 36, 75, 76). The regulator (40) can regulate the steering angles of the second wheels (31, 32) and the third wheels (71, 72) to repeatedly rotate in the range of a specific angle. Further, the range of the repetitive angle may be significantly large or small, and regular or irregular. Of course, the steering angle of the second wheels (31, 32) may be regulated to be different from the steering angle of the third wheels (71, 72).

Accordingly, the route (100) of the first wheels, the route (200) of the second wheels and the route (300) of the third wheels become different.

Further, in a vehicle configured to comprise three or more pairs of wheels, the routes (100, 200, 300) of all the wheels may be regulated to be different as illustrated in FIG. 6, 7, or 8.

As stated above, in the vehicle (1) according to the present invention, routes of the wheels are controlled. In the first mode (51), the routes (100, 200) of the first wheels and the second wheels are controlled to be identical in various types. In the second mode (52), the routes (100, 200) of the first wheels and the second wheels can be controlled to be different in various types. If necessary, the first mode (51) and the second mode (52) can be optionally selected by a driver to enhance fuel consumption or to achieve terrainability.

The invention claimed is:

1. A vehicle with a controllable wheel route, comprising:
    a vehicle body;
    a first pair of wheels, which are individually suspended on both sides of the vehicle body to roll on the ground and can rotate around the vertical axis;
    a second pair of wheels, which are individually suspended on both sides of the vehicle body to roll on the ground, can rotate around the vertical axis, and are placed in the back of the first wheels;
    a regulator, which regulates each steering angle on the vertical axis of the first and second wheels; a mode selector, which is configured to select a first mode and a second mode; and
    a controller, which receives the first mode signal or the second mode signal from the mode selector and controls the regulator according to the received signal, wherein the second wheel route is regulated to be identical to the first wheel route in the first mode, and the second wheel route is regulated to be different from the first wheel route in the second mode.

2. The vehicle with a controllable wheel route according to claim 1, wherein the regulator regulates the first wheels and the second wheels to be linearly arranged without rotating around the vertical axis.

3. The vehicle with a controllable wheel route according to claim 1, wherein the regulator regulates the first wheels and the second wheels to be arranged on a curve which forms a concentric circle with the vehicle center route, so that the steering angle around the vertical axis of the first and second wheels, which are placed on the outer side of the curve, is smaller than the steering angle around the vertical axis of the first and second wheels, which are placed on the inner side of the curve, in the first mode.

4. The vehicle with a controllable wheel route according to claim 1, wherein the regulator regulates the second wheel route to repeatedly cross the first wheel route in the second mode.

5. The vehicle with a controllable wheel route according to claim 4, wherein the regulator regulates the first wheels to be arranged without rotating around the vertical axis and the second wheels to repeat a clockwise rotation and a counterclockwise rotation around the vertical axis in the second mode.

6. The vehicle with a controllable wheel route according to claim 4, wherein the regulator regulates the second wheels to be arranged without rotating around the vertical axis and the first wheels to repeat a clockwise rotation and a counterclockwise rotation around the vertical axis in the second mode.

7. The vehicle with a controllable wheel route according to claim 4, wherein the regulator regulates the steering angle of the first and second wheels around the vertical axis to be identical and to repeat a clockwise rotation and a counterclockwise rotation in the second mode.

8. The vehicle with a controllable wheel route according to claim 1, wherein the regulator regulates the second wheel route to be parallel with the first wheel route in the second mode.

9. The vehicle with a controllable wheel route according to claim 1, further comprising a third pair of wheels, which are individually suspended to roll on the ground, can rotate around the vertical axis, and are placed in the back of the second wheels, wherein the regulator also regulates the steering angle around the vertical axis of the third wheels, the third wheel route is regulated to be identical to the first wheel route and the second wheel route in the first mode, and the third wheel route is regulated to be different from the first wheel route and the second wheel route in the second mode.

10. The vehicle with a controllable wheel route according to claim 1 comprising
    a drive unit, which individually drives the first wheels and the second wheels; and
    a transmission, which changes the speed of the first wheels and the second wheels.

11. The vehicle with a controllable wheel route according to claim 9, comprising a drive unit, which individually drives the first wheels, the second wheels and the third wheels; and a transmission, which changes the speed of the first wheels, the second wheels and the third wheels.

* * * * *